Sept. 14, 1943. W. W. GARDNER 2,329,345
SAW TABLE
Filed Aug. 1, 1940

INVENTOR.
Wallace W. Gardner
BY Ramsey, Kent, Chisholm and Lutz
his ATTORNEYS

Patented Sept. 14, 1943

2,329,345

UNITED STATES PATENT OFFICE 2,329,345

SAW TABLE

Wallace W. Gardner, Lancaster, Pa., assignor to De Walt Products Corporation, Lancaster, Pa., a corporation of Pennsylvania Application August 1, 1940, Serial No. 349,151

3 Claims. (Cl. 143—132)

This invention relates to saw tables and more particularly to tables especially adapted for use in connection with saws which are mounted for horizontal movement relative to an arm or support and which are also capable of limited rotation about a vertical axis.

An object of the present invention is to provide a table of such construction that it can be levelled at the will of an operator.

Another object of the invention is to provide a table construction of such character that the table can be levelled, while attached to a base, in such fashion that machining or finishing of the base is not required.

A further object of the invention is to provide a table of such construction that the upper surface thereof can be levelled relative to any and all positions a saw associated therewith may assume in the normal operation thereof.

An additional object of the invention is to provide a table attached to a plurality of supporting cleats which cleats in turn are adjustably secured to a supporting base.

A still further object of the invention is to provide an adjustment for the cleats of such fashion that the level of a table attached to the cleats can be adjusted at a plurality of points along the length of each individual cleat.

Figure 1:
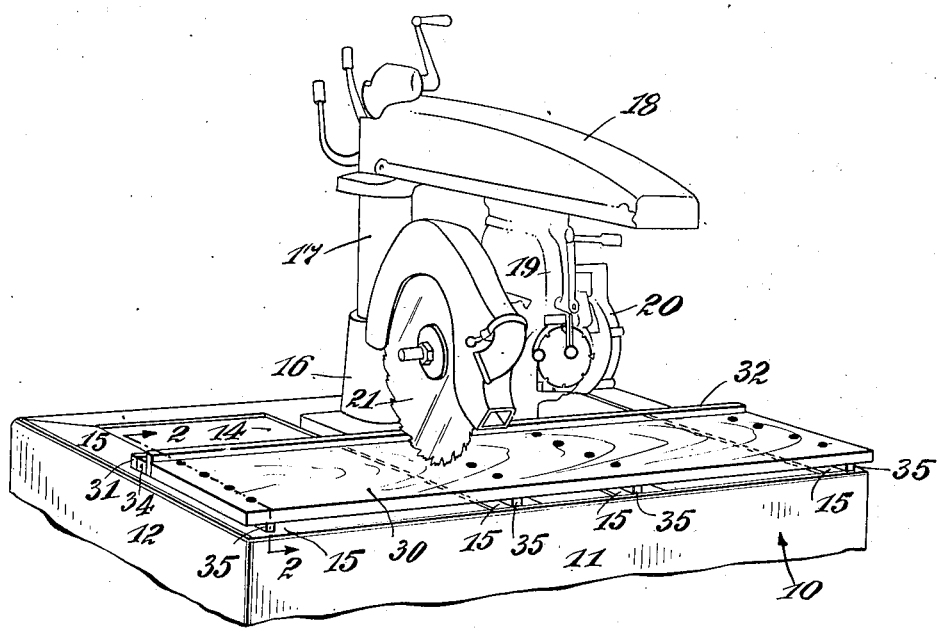
Figure 2:
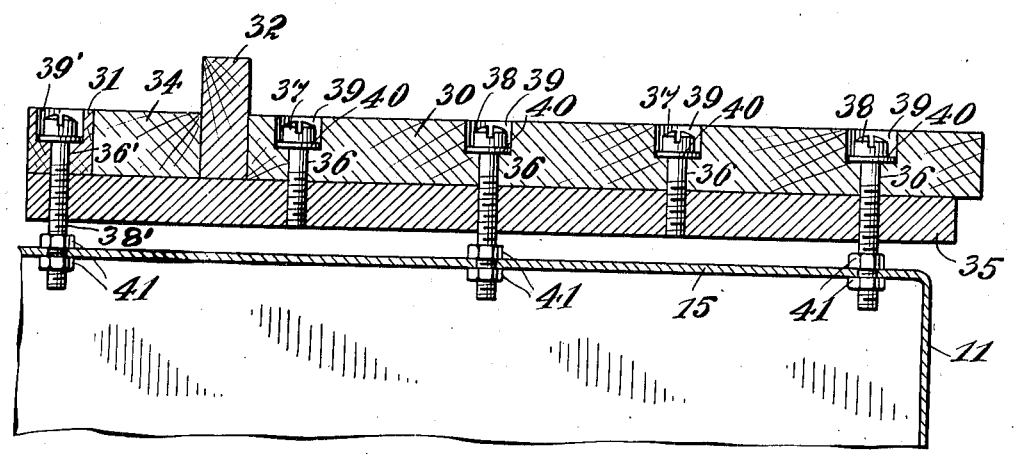

Other features, objects and advantages of the invention will be apparent by reference to the following detailed description of the accompanying drawing wherein:

Fig. 1 is a perspective view of a structure embodying the invention, such view showing a top part of a base, a table adjustably attached thereto for levelling purposes and a saw associated therewith, and Fig. 2 is an enlarged section taken substantially on the line 2—2 of Fig. 1.

Referring now to the drawing, 10 indicates generally a base for a saw machine, such base being made in suitable fashion from steel in the form either of plates, channels or the like which are welded or otherwise secured together to provide a front wall 11, end walls 12 and a rear wall 14. Also formed as part of the base are four rib members 15 extending from the front wall 11 to the rear wall 14. These rib members 15 may be made of steel channels or of any other steel form providing a substantially flat top. As will be seen in Fig. 1 the two intermediate ribs are located in close proximity while the end ribs 15 are spaced equidistantly from the two center ribs. The center ribs 15 serve to support a throat member 16 having an elevator column 17 vertically movable therein. To the top of this column 17 is secured an arm 18, which arm can rotate relative to the column. Mounted for longitudinal movement relative to the arm is a carriage (not shown) supporting a yoke 19, which in turn carries a motor 20 driving a saw 21. Inasmuch as the construction of the saw portion including the throat, column, arm, yoke and the like form no part of this invention, detailed illustration and description have been omitted.

The table associated with the saw mechanism comprises a slab 30 of wood, which slab may be made up of a number of individual pieces of wood secured together in such fashion as to constitute a table or may be made, for the principal part, of a single piece of wood. Also formed as part of the table is a rear member 31, a stop 32 and wedge members 34 for locking the stop between the front part 30 and the rear part 31. The table is secured in adjustable fashion to the base 10 in the following manner. A plurality of metallic cleats 35 (four in number are shown) are disposed beneath the table in such fashion as to register with the median longitudinal line of each rib 15. The cleats 35 may be of square metal stock and of suitable dimensions. The front part of the table 30 is provided with a plurality of through openings 36 for the passage of bolts 37 and 38. The heads of the bolts 37 and 38 are located in counterbores 39 in the upper surface of the table and bear against washers 40 in the bottoms of these counterbores. Each cleat 35 is provided with threaded apertures in alignment with the apertures 36 to receive the bolts 37 and 38 to thereby lock the part 30 to the cleat. The part 31 is provided with a similar through opening 36', with a counterbore 39' and with a bolt 38' likewise threaded into an aperture in the cleat. In this fashion both the parts 30 and 31 are secured firmly to each of the cleats 35. It should be noted however that the bolts 38 and 38' are longer than the bolts 36, the bolts 38 and 38' being of sufficient length to pass through unthreaded openings in the individual ribs 15. Each of the cleats 35 is held locked to its rib 15 by means of jam nuts 41 threaded on to the bolts 38 and 38' with one jam nut of each pair located above the top surface of the rib and the other beneath the under surface of the rib. When the two nuts are jammed tight it will be evident that the bolt on which they are threaded will be held locked relative to the rib so that the cleat is likewise held locked to the rib in spaced relation thereto.

Should any part of the surface of the table 30 or the part 31 be found to be out of level, then such part can be brought into true level by adjusting the jam nuts associated with the bolts adjacent the part out of level until the desired results have been accomplished. For example, if the right-hand corner of the table, as shown in Fig. 2, should be depressed out of level, then it can be elevated by first loosening the bottom nut of the pair 41 associated with the right-hand bolt 38 rotating the top nut 41 until the corner of the table has been elevated to the desired height and then tightening the bottom nut against the under surface of the rib 15. A reverse operation will result in lowering the part of the table adjacent a bolt on which the adjustment takes place.

The adjustment arrangement just described is of particular advantage when the table is used with a saw of the type shown in Fig. 1 since this adjustment feature makes possible the levelling of the upper surface of the table relative to all saw positions instead of merely level as generally conceived. To this end it is better practice to affix a pointer to some part of the saw 21 or the shaft supporting the same than to move the saw with its pointer close to the surface of the table to all positions of which the saw is capable. These positions are determined by rotation of the arm 18 about the top of column 17 and also by longitudinal movement of the saw relative to the arm 18. If the pointer indicates that any parts of the table are lower or higher, relative to saw positions, than would permit efficient operation, then such areas can be either raised or lowered until the pointer indicates that the proper level has been attained.

The present adjusting arrangement also is of advantage in that a base can be made of channels or other metal forms welded or otherwise secured together without the necessity of machining the parts after the welding or other assembly operation have been completed. In this manner considerable time, labor and expense can be avoided since it is possible to adjust the table by the bolt and jam nut assemblies regardless of minor variations in surface height of the ribs or other component parts of the base. Furthermore, since it is desirable that machines of this character be readily movable from place to place during building operations, the parts must be of minimum weight, with the consequent chances of twisting of some of the parts out of proper alignment. The adjusting mechanism can be used to compensate for any twisting of the base.

From the foregoing it will be seen that the present invention provided novel, simple and efficient mechanism for assuring proper levelling of the upper surface of a table particularly relative to a working tool. It is to be understood that the invention can be modified beyond the illustrated embodiment with only the limitations set forth in the following claims to be imposed thereupon.

What is claimed is:

1. In a device of the type described, a base, a table, a plurality of cleats, bolts securing said cleats beneath said table and being fastened to said cleats and table against movement relative thereto, said bolts extending through said cleats and through said base, and a pair of jam nuts associated with each bolt for securing it to the base; said pairs of jam nuts being adjustable to vary the height of associated parts of the cleats and of the table relative to said base.

2. In a device of the type described, a base, a table, a plurality of cleats secured beneath said table, and bolt and nut assemblies for securing each of said cleats to said base at a plurality of points along each cleat, the bolt of each assembly being fastened to the table and a cleat against movement relative thereto, said assemblies being individually adjustable to vary the height of associated parts of the cleats and of the table relative to said base.

3. In a device of the type described, a base, a table, a plurality of cleats secured beneath said table, bolts extending downwardly from spaced points along each cleat and held against rotation, said bolts passing through the top of said base, and a pair of nuts assembled with each of said bolts, said nuts being jammed against the opposite surfaces of the top of the base to lock the bolt to the base, said nuts being adjustable to vary the elevation of the associated parts of the cleats and of the table relative to the base.

WALLACE W. GARDNER.